United States Patent
Inoue et al.

(10) Patent No.: US 6,341,319 B1
(45) Date of Patent: Jan. 22, 2002

(54) SYSTEM AND METHOD FOR TRANSMITTING/RECEIVING SIGNAL LEVEL DATA

(75) Inventors: Hiraku Inoue, Kanagawa; Harumi Kawamura; Atsushi Endo, both of Tokyo; Kazuo Yamamoto, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/232,633

(22) Filed: Jan. 19, 1999

(30) Foreign Application Priority Data

Jan. 23, 1998 (JP) .......................................... P10-011019

(51) Int. Cl.$^7$ .............................................. G06F 13/00
(52) U.S. Cl. ........................ 710/52; 710/105; 370/395; 385/82; 381/2
(58) Field of Search ................... 710/105, 52; 370/395; 386/82; 381/2

(56) References Cited

U.S. PATENT DOCUMENTS

| | | | |
|---|---|---|---|
| 4,930,069 A | 5/1990 | Batra et al. .................. | 709/212 |
| 5,214,705 A | 5/1993 | Kloker et al. .................. | 381/2 |
| 5,933,430 A | 8/1999 | Osakabe et al. ............. | 370/395 |
| 5,991,842 A | 11/1999 | Takayama .................... | 710/105 |
| 6,055,589 A | 4/2000 | Kawamura et al. ........... | 710/52 |
| 6,137,949 A | 10/2000 | Horiguchi et al. ............. | 386/82 |
| 6,138,196 A | 10/2000 | Takayama et al. .......... | 710/105 |

FOREIGN PATENT DOCUMENTS

| | | | |
|---|---|---|---|
| EP | 0762684 A2 | 3/1997 | ............ H05H/1/00 |
| EP | 084856 A1 | 6/1998 | ........... H04Q/11/00 |
| EP | 0849884 A1 | 6/1998 | ............ H04B/1/20 |
| EP | 0849913 A2 | 6/1998 | ........... H04L/12/28 |
| EP | 0939523 A2 | 9/1999 | ........... H04L/12/64 |
| EP | 1045390 A2 | 10/2000 | ........... G11B/10/12 |
| JP | 07050879 A | 2/1995 | ............ H04Q/9/00 |
| JP | 09116593 A | 5/1997 | ........... H04L/29/06 |
| JP | 10174073 A | 6/1998 | ............ H04N/7/10 |
| JP | 10178438 A | 6/1998 | ........... H04L/12/40 |
| JP | 10178686 A | 6/1998 | ............ H04Q/9/00 |
| JP | 11162150 A | 6/1999 | ........... G11B/27/10 |

Primary Examiner—Thomas Lee
Assistant Examiner—Tammara Peyton
(74) Attorney, Agent, or Firm—Jay H. Maioli

(57) ABSTRACT

A transmitting system consisting of a control apparatus and a target apparatus connected mutually via an IEEE1394 bus wherein unitary data having an isochronous gap for transmission of audio main data and an asynchronous gap for transfer of command data are transmitted between the control apparatus and the target apparatus via the bus. The control apparatus includes a unit for sending an identifier to identify the target apparatus by the use of the asynchronous gap, and also a command to request transfer of a signal level from the target apparatus. The target apparatus includes a unit for receiving the identifier from the sending unit of the control apparatus via the IEEE1394 bus and also the command to request transfer of the signal level of the target apparatus; and a unit for sending an audio signal level in response to the signal-level transfer request command received by the receiving unit. In this system, an output level can be set in and read out from the target apparatus by the control apparatus.

9 Claims, 9 Drawing Sheets

FIG. 1
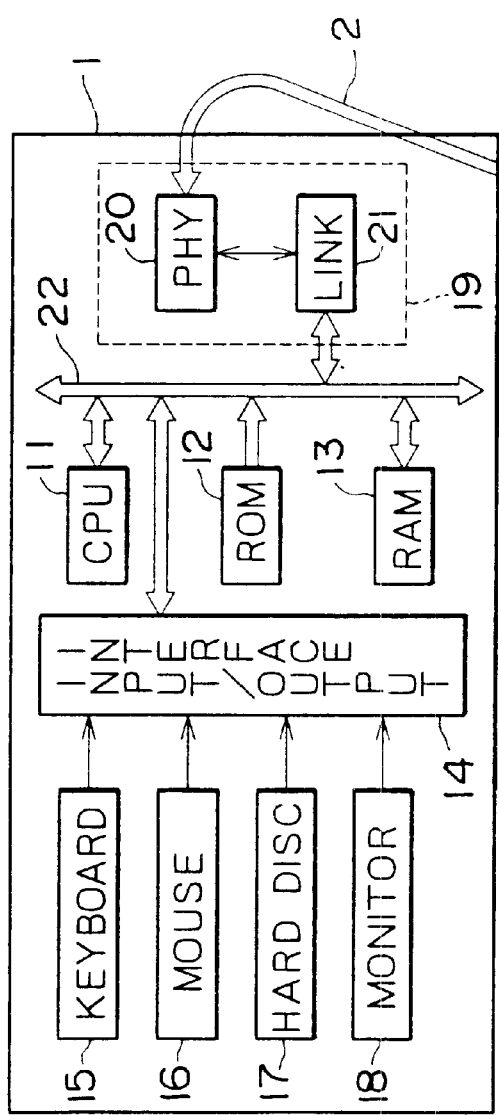
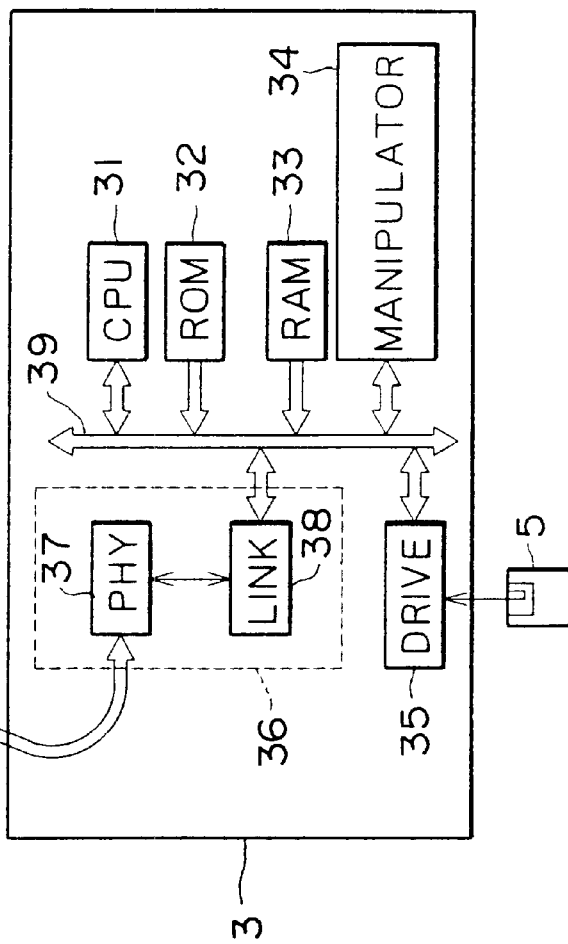

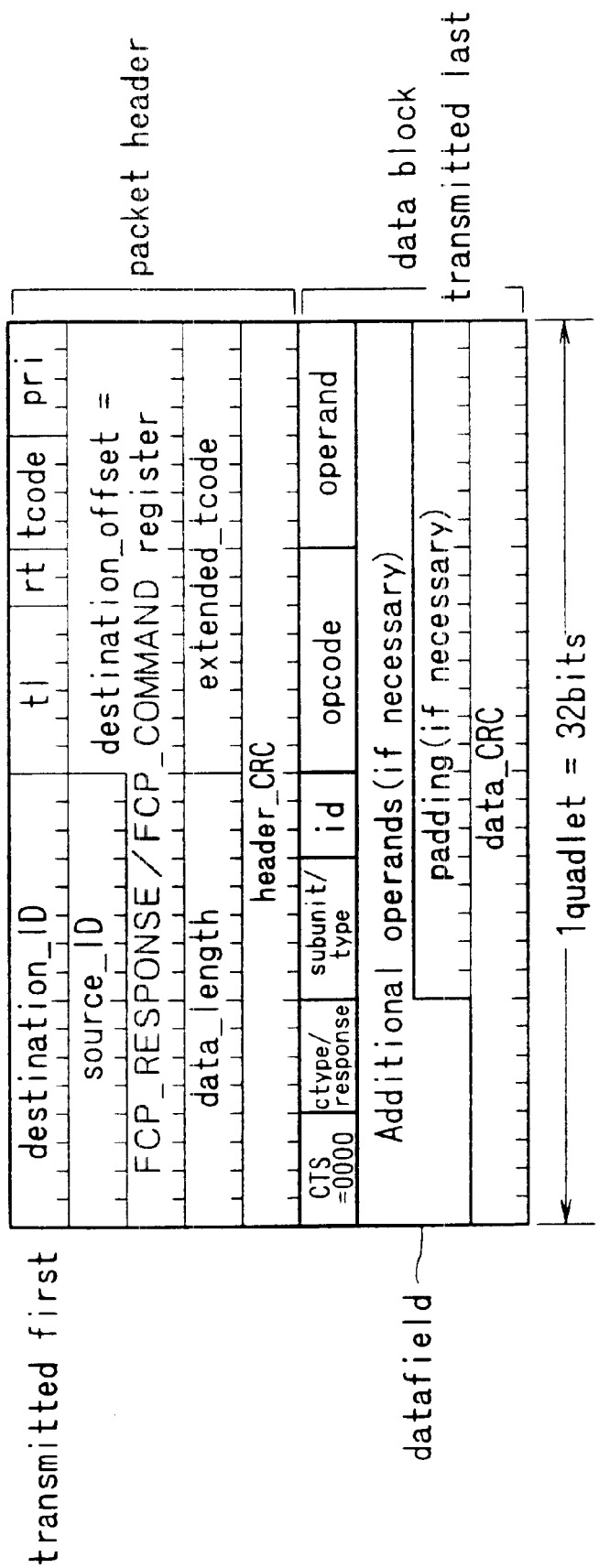

FIG. 4

| | | |
|---|---|---|
| Command | 0000<br>0001<br>0010<br>0011<br>0100<br>⟨<br>0111 | CONTROL<br>STATUS<br>INQUIRY<br>NOTIFY<br><br>(reserved) |
| Response | 1000<br>1001<br>1010<br>1011<br>1100<br>1101<br>1110<br>1111 | NOT IMPLEMENTED<br>ACCEPTED<br>REJECTED<br>IN TRANSITION<br>IMPLEMENTED/STABLE<br>CHANGED<br>(reserved)<br>INTERIM |

FIG. 5

| | |
|---|---|
| 00000<br>⟨<br>00011<br>00100<br>00101<br>00111<br>⟨<br>11111 | Monitor<br>(reserved)<br>Disc recorder/player<br>VCR<br>Tuner<br>Camera<br>(reserved)<br>Unit* |

FIG. 6A

| | Msb | | | | | | lsb |
|---|---|---|---|---|---|---|---|
| Opcode | Audio Level Read ||||||||
| Operand[0] | Plug Number |||||||| command

FIG. 6B

| | Msb | | | | | | lsb |
|---|---|---|---|---|---|---|---|
| Opcode | Audio Level Read |||||||
| Operand[0] | Plug Number |||||||
| Operand[1] | Number of Channel |||||||
| Operand[2] | OVER | Msb ||||||
| Operand[3] | Audio Level[0] (15bit) | | | | | | lsb |
| ⋮ | ⋮ ||||||||
| Operand[ ] | OVER | Msb ||||||
| Operand[ ] | Audio Level[n-1] (15bit) | | | | | | lsb | response command response

FIG. 10A

| | Msb | | | | | | | lsb |
|---|---|---|---|---|---|---|---|---|
| 00h | \multicolumn{8}{c}{Plug Number} |
| 01h | \multicolumn{8}{c}{Plug Status length} |
| | \multicolumn{8}{c}{Status length} |
| | \multicolumn{8}{c}{Status} |
| | | | | | | | | |
| | \multicolumn{8}{c}{Position length} |
| | \multicolumn{8}{c}{Position} |
| | | | | | | | | |
| | \multicolumn{8}{c}{Mode length} |
| | \multicolumn{8}{c}{Mode} |
| | | | | | | | | |
| | \multicolumn{8}{c}{Audio level length} |
| | \multicolumn{8}{c}{Audio Level} |
| | | | | | | | | |

Plug Status Descriptor

FIG. 10B

| | Msb | | | | | | | lsb |
|---|---|---|---|---|---|---|---|---|
| 00 | \multicolumn{8}{c}{Number of Channel} |
| 01h | OVER | Msb | | | | | | |
| 02h | \multicolumn{7}{c}{Audio Level [0] (15bit)} | lsb |
| ⋮ | \multicolumn{8}{c}{⋮} |
| 2n-1 | OVER | Msb | | | | | | |
| 2n | \multicolumn{7}{c}{Audio Level [n-1] (15bit)} | lsb |

Audio Level

| Plug Number = 0 | 00h |
| :--- | :--- |
| ⋮ | ⋮ |
| F0h | 40h |
| 1Ah | 41h |
| CCh | 42h |
| 1Bh | 43h |
| ⋮ | ⋮ |

Plug Status Descriptor

| Read Descriptor |
| :---: |
| Plug Status Descriptor |
| Offset = 40h |
| Number of bytes = 4 | command

| Plug Status Descriptor |
|---|
| Offset = 40h |
| Number of bytes = 4 |
| F0h |
| 1Ah |
| CCh |
| 1Bh | response

SYSTEM AND METHOD FOR TRANSMITTING/RECEIVING SIGNAL LEVEL DATA

BACKGROUND OF THE INVENTION

1. Field of the Invention

The present invention relates to a transmitting system, a transmitting method and a transmitting/receiving system, and more particularly to those where commands for reading out audio level information are defined so that the audio level information of a controlled audio apparatus connected via an IEEE1394 bus can be read out therefrom by a control apparatus.

2. Description of the Related Art

Recently, there is proposed a system where data can be transferred between electronic apparatus such as an audio apparatus and a personal computer connected mutually via an IEEE (Institute of Electrical and Electronics Engineers) 1394 bus.

An IEEE1394 bus employed in such a system is a serial bus adapted for fast transfer of data similarly to an SCSI (Small Computer Systems Interface). The use of this bus enables transfer of both data and a control command via a single cable by two methods termed isochronous transfer and asynchronous transfer.

Consequently, it becomes possible to control, by means of a control apparatus such as a personal computer, a recording, reproduction or stop operation of any target apparatus to be controlled, such as an MD (Mini Disc) player or the like, or to control editing of tracks such as division, coupling or erasure thereof.

In this system, transfer of audio level information is rendered necessary to realize an application where, as in an audio level meter for example, its display is changed in accordance with the audio level of a predetermined audio signal recorded or reproduced in an audio apparatus. However, in the conventional system known heretofore, there exists a problem that audio level information cannot be acquired since any command for reading out the audio level information of an audio apparatus connected via an IEEE1394 bus is not defined.

SUMMARY OF THE INVENTION

It is therefore an object of the present invention to provide a transmitting system, a transmitting method and a transmitting/receiving system where an output level can be set in a controlled target apparatus from a control apparatus through connection via an IEEE1394 bus, and a command signal sent from the control apparatus to the target apparatus can be set for reading out the preset output level from the target apparatus by the control apparatus.

According to a first aspect of the present invention, there is provided a transmitting system where unitary data having an isochronous gap for transmission of main data and an asynchronous gap for transfer of command data are transmitted between a control apparatus and a controlled target apparatus via a predetermined bus. The control apparatus comprises a sending means for sending an identifier to identify the target apparatus by the use of the asynchronous gap, and also a command to request transfer of a signal level from the controlled target apparatus. And the target apparatus comprises a receiving means for receiving the target apparatus identifier transmitted by the use of the asynchronous gap from the sending means of the control apparatus via the predetermined bus, and also receiving the command to request transfer of a signal level from the target apparatus; and a sending means for sending the signal level in response to the signal-level transfer command received by the receiving means.

According to a second aspect of the present invention, there is provided a transmitting method whereby unitary data having an isochronous gap for transmission of main data and an asynchronous gap for transfer of command data are transmitted between a control apparatus and a controlled target apparatus via a predetermined bus. This method comprises a step of sending, from the control apparatus to the target apparatus, an identifier to identify the target apparatus by the use of the asynchronous gap, and also a command to request transfer of a signal level from the target apparatus; a step of receiving the target apparatus identifier transmitted by the use of the asynchronous gap via the predetermined bus, and also receiving the command to request transfer of a signal level from the target apparatus; and a step of sending the signal level from the target apparatus to the control apparatus in response to the received command which requests transfer of the signal level from the target apparatus.

And according to a third aspect of the present invention, there is provided a transmitting/receiving system for receiving unitary data having an isochronous gap and an asynchronous gap and transmitted from a control apparatus via a predetermined bus. This system comprises a receiving means for receiving a target apparatus identifier transmitted from the control apparatus via the predetermined bus by the use of the asynchronous gap, and also receiving a command to request transfer of a signal level from the target apparatus; and a sending means for sending the signal level in response to the signal-level transfer request command received by the receiving means.

The above and other features and advantages of the present invention will become apparent from the following description which will be given with reference to the illustrative accompanying drawings.

BRIEF DESCRIPTION OF THE DRAWINGS

FIG. 1 is a block diagram of a personal computer 1 as a controller and an MD player 3 as a controlled target connected mutually via an IEEE1394 bus in the present invention;

FIG. 3 shows a data structure of an asynchronous packet;

FIG. 4 shows a data structure of "ctype/response" in an asynchronous packet;

FIG. 5 shows a data structure of "subunit-type" indicating the kind of a destination apparatus to which an asynchronous packet command is transferred, or the kind of a source apparatus from which a response is sent;

FIG. 6A shows a data structure of a command transferred in an asynchronous packet;

FIG. 6B shows a data structure of a response transferred in a asynchronous packet;

FIG. 10A shows a data structure of a plug status descriptor transferred when reading out an audio level preset in the MD player 3 as a target from the personal computer 1 as a controller connected mutually via the IEEE1394 bus in the present invention;

FIG. 10B shows a data structure of audio levels in a plug status descriptor preset in the MD player 3 as a target from the personal computer 1 as a controller connected mutually via the IEEE1394 bus in the present invention;

DESCRIPTION OF THE PREFERRED EMBODIMENTS

Figure 2:
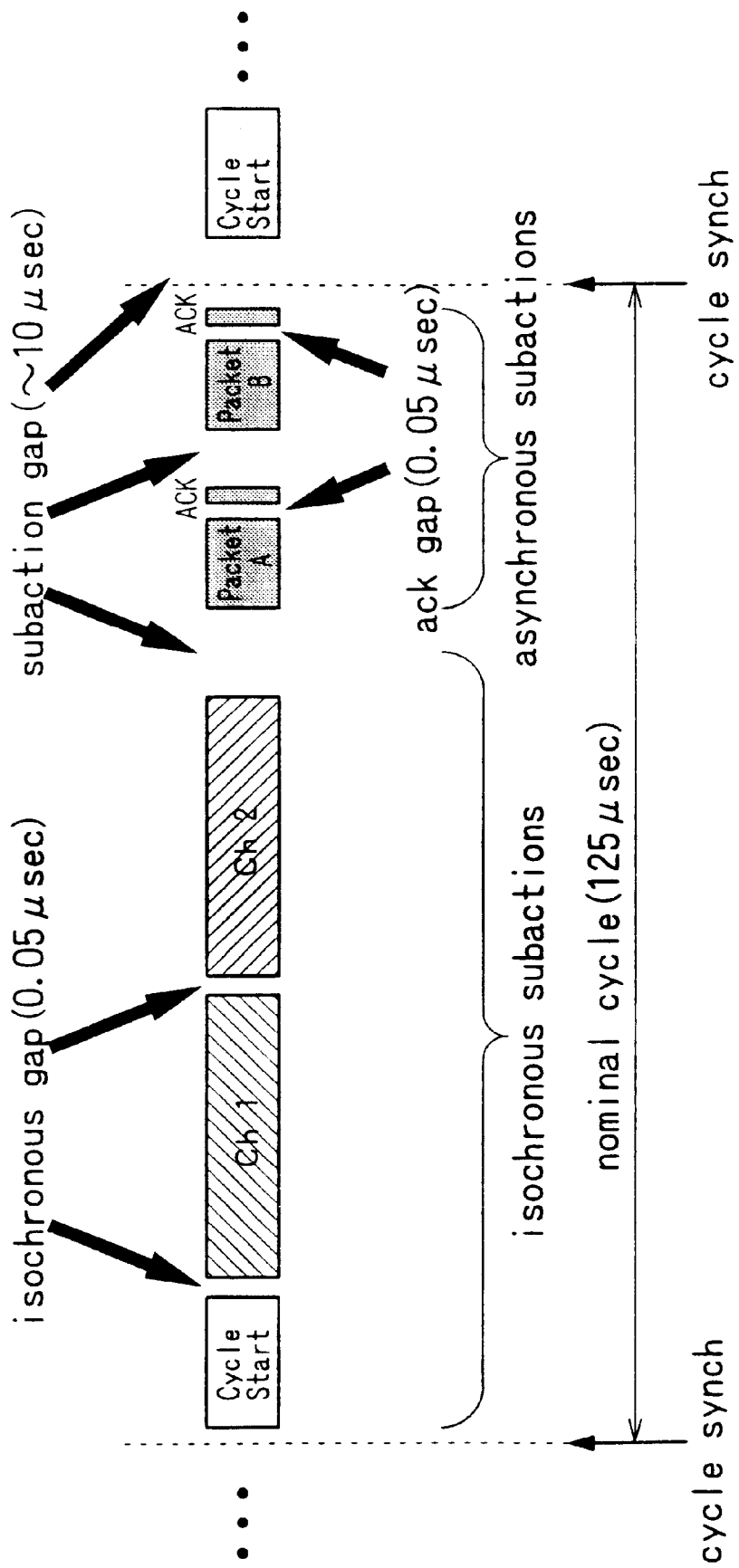
FIG. 2 shows a data structure of isochronous communication and asynchronous communication within a unitary data length transmitted via the IEEE1394 bus in the present invention.

FIG. 1 is a block diagram showing a structural example of an information processing system where the present invention is applied. In this specification, the term "system" signifies an entire configuration comprising a plurality of apparatus. In this example, a personal computer 1 and an MD (Mini Disc) player 3 are mutually connected via an IEEE1394 bus 2. The personal computer 1 is connected via the IEEE1394 bus 2 to a 1394 communicator 19 consisting of a sending means or a receiving means. The 1394 communicator 19 is composed of a PHY (physical layer protocol) 20 and a LINK 21. The PHY 20 demodulates a packet inputted via the IEEE1394 bus 2 and then outputs the demodulated packet to the LINK 21. Further the PHY 20 modulates a packet supplied from the LINK 21 and then sends the modulated packet to the MD player 3 via the IEEE1394 bus 2. The LINK 21 extracts the data included in the packet supplied from the PHY 20 and outputs the extracted data to a CPU 11. Further the LINK 21 packetizes the data and then outputs the same to the PHY 20.

The CPU 11 executes various processes in accordance with a program recorded in a ROM 12. In a RAM 13, there are recorded data and a program required for the CPU 11 to execute various processes. A keyboard 15 and a mouse 16 are connected to an input/output interface 14, and a manipulation signal supplied therefrom is outputted to the CPU 11. A hard disk 17 is also connected to the input/output interface 14, so that the CPU 11 can record or read the data or program via the input/output interface 14. Further a monitor 18 is connected to the input/output interface 14. And an internal bus 22 consisting of a PCI (Peripheral Component Interconnect) or a local bus serves to connect the system components mutually.

The MD player 3 is connected via a 1394 communicator 36 to the IEEE1394 bus 2. The 1394 communicator 36 consisting of a sending means or a receiving means is composed of a PHY 37 and a LINK 38, and demodulates a packet supplied from the personal computer 1 via the IEEE1394 bus 2 and extracts the data therefrom. Further the 1394 communicator 36 packetizes the predetermined data, modulates the packet and then sends the same to the personal computer 1 via the IEEE1394 bus 2. A CPU 31 executes various processes in accordance with a program stored in a ROM 32. In a RAM 33, there are stored data and a program required for the CPU 31 to execute various processes. A manipulator 34 consists of buttons, switches, a remote controller and so forth and, when manipulated by a user, outputs to the CPU 31 a signal corresponding to such manipulation. A drive 35 serves to drive an MD 5 loaded as a recording medium for reproducing or recording predetermined data. An internal bus 39 is used to connect such system components mutually.

The IEEE1394 bus 2 is used for assigning node numbers to the personal computer 1 and the MD player 3 connected thereto in this embodiment and performing basically periodic communication between such electronic apparatus. Periodic communication is performed in an isochronous mode, while communication unrelated to the period is performed in an asynchronous mode. Principally, transfer of command is executed during the asynchronous mode while transfer of data is executed during the isochronous mode.

FIG. 2 shows a data structure of such isochronous communication and asynchronous communication within a unitary duration of each cycle. One packet has a length of 125 μsec, and Cycle Start as a header and an isochronous gap of 0.05 μsec are inserted between channels.

Audio data and video data are transferred as main data by the use of channel 1 (Ch1) and channel 2 (Ch2) shown in this diagram.

Thereafter asynchronous communication data are disposed. A command signal "packet" and a reply signal "ACK" are transferred as a pair, and a subaction gap having a maximum length of 10 μsec is inserted between pairs of the command signal "packet" and the reply signal "ACK".

In the IEEE1394 bus 2, three packets of Write, Read and Lock are used as asynchronous packets. FIG. 3 shows the format of a Write packet (Write Request for Data Block). In its packet header, "destination_ID" denotes ID of a destination to which data are transferred, and concretely the node number of a destination electronic apparatus specified in the IEEE1394 bus 2 is described here. Also in the packet header, "tl" (transact label) denotes the packet number; "rt" (retry code) denotes a code signifying a packet transmitted first or a packet transmitted again; "tcode" (transaction code) denotes a command code; and "pri" (priority) denotes the priority order of the packet.

Further in the packet header, "source_ID" denotes ID of a source from which data are transferred, and concretely the node number of a source electronic apparatus is described here; "destination_offset" denotes addresses of a command register and a response register; "data_length" denotes the data length of a data field; "extended_tcode" is used when the tcode is extended; and "header_CRC" denotes a CRC (cyclic redundancy check) value to calculate a check sum of the packet header.

A data block is disposed next to the packet header mentioned above, and "CTS" (Command and Transaction Set) is described at the top of its data field (enclosed with a thick line in FIG. 3). If the value of "CTS" is set to 0000 for example, the one described in the data field is defined as an AV/C command. And "data_CRC" is disposed next to the data field.

In the embodiment of the present invention, an AV/C command is used as "CTS", i.e., a value 0000 is described in "CTS" of FIG. 3. And next to "CTS", there is described "ctype" (Command type) representing the functional class of the command or "response" representing the process result obtained in accordance with each command.

FIG. 4 shows kinds of such "ctype" and "response". In "ctype" where values ranging from 0000 to 0011 are described, there are defined a command CONTROL for controlling the function from the outside, a command STATUS for inquiring the status from the outside, a command INQUIRY for inquiring the presence or absence of a control command support from the outside, and a command NOTIFY for notifying the outside of a change in the status. In "response", there are defined NOT_IMPLEMENTED, ACCEPTED, REJECTED, IN TRANSITION, IMPLEMENTED, and further STABLE, CHANGED and INTERIM. These responses are used separately in accordance with the kinds of the commands. For example, one response corresponding to the command CONTROL is selected out of NOT IMPLEMENTED, ACCEPTED, REJECTED and INTERIM.

Referring to FIG. 3 again, "subunit_type" indicates a command destination apparatus or a response source apparatus. In the description here, an apparatus itself is termed a unit, and a component included therein is termed a subunit. As shown in FIG. 5, "subunit_type" is classified into six kinds including Monitor, Disc_recorder/player, VCR (Video Cassette Recorder), Tuner, Camera, and Unit used in case no subunit is existent. For example, when the relevant subunit is a Disc recorder/player, the value of "subunit" is set to 00011. In FIG. 3, "id" indicates an identification number (node_ID) for identifying the relevant subunit in case a plurality of subunits of the same kind are existent.

"Opcode" signifies an Operation Code, and "operand" signifies information (parameter) required for the opcode. These are defined per subunit. In the embodiment of this invention, an Audio Level Read Command for reading out audio level information is defined as "opcode" relative to a Disc recorder/player. FIGS. 6A and 6B show exemplary descriptions of such command and response, respectively. In a command sent from the personal computer 1 serving as a controller, there is described a value indicative of Audio Level Read as "opcode", and next is described an identification number (Plug Number) for identifying a logical plug to execute transfer of data through connection to the MD player 3 serving as a target electronic apparatus to be controlled.

In a response sent from the target apparatus, there is described a value indicative of Audio Level Read as "opcode", and next are disposed Plug Number and Number of Channel which indicates the channel number of audio data. And finally, Audio Level representing audio level information is described. In the audio level, there is described the peak value (absolute value) composed of 15 bits out of two bytes in each channel and included in the range from the preceding read to the next read. The remaining one bit (MSB(OVER)) is set to 1 in the case of full-scale data (above 0 dB).

Figure 7:
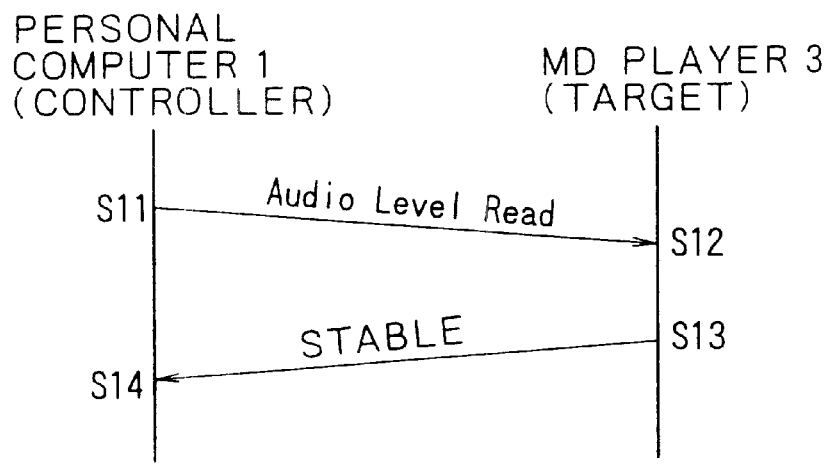
FIG. 7 is a timing chart of commands transmitted between the personal computer 1 as a controller and the MD player 3 as a controlled target connected mutually via the IEEE1394 bus in the present invention.
Figure 8:
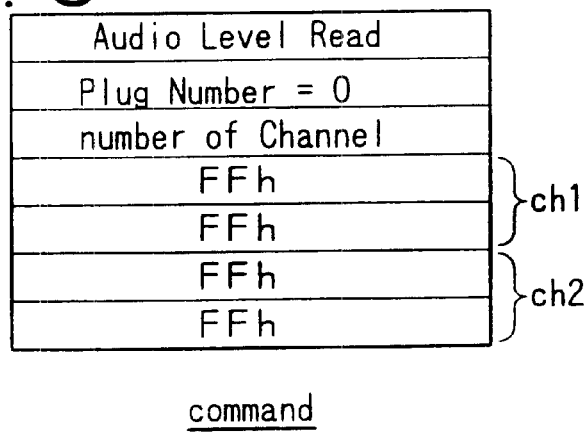
FIG. 8 shows a command transmitted from the personal computer 1 as a controller and the MD player 3 as a target connected mutually via the IEEE1394 bus in the present invention.

FIG. 7 is a timing chart to explain the process of reading the audio level information from the MD player 3 by the use of an Audio Level Read Command. It is assumed here that the plug (Unit Plug) of the MD player 3 is numbered 0. First at step S11, the CPU 11 of the personal computer 1 controls the 1394 communicator 19 to thereby send an audio level information read command (Audio Level Read) via the IEEE1394 bus 2 to the MD player 3. FIG. 8 shows an example of such command. In this example, the command is so set as to read out the audio level information in two channels (ch1 and ch2). That is, the two channels correspond to the audio level signals of right and left channels in audio stereo.

Figure 9:
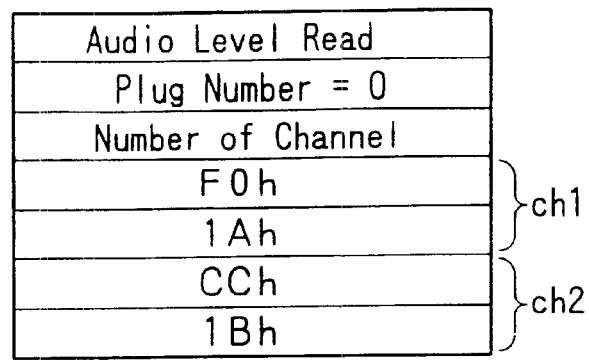
FIG. 9 shows a response transmitted from the MD player 3 as a target to the personal computer 1 as a controller connected mutually via the IEEE1394 bus in the present invention.

Subsequently at step S12, the CPU 31 of the MD player 3 receives the command (Audio Level Read) sent thereto from the personal computer 1. Then at step S13, the CPU 31 sends a response (STABLE), where the audio level information is described as shown in FIG. 9, via the IEEE1394 bus 2 to the personal computer 1. And at step S14, the CPU 11 of the personal computer 1 receives the response from the MD player 3 via the 1394 communicator 19. Consequently, the CPU 11 of the personal computer 1 acquires the audio level information of the MD player 3.

Next, an explanation will be given on the process of reading out the audio level by the use of "Descriptor" of an AV/C command. In this embodiment, it is supposed that the MD player 3 has, in the RAM 33 for example, a descriptor (Plug Status Descriptor) used to describe the audio level information. FIG. 10A shows an example of such "Plug Status Descriptor". In this example, an identification number for identifying the plug is described in "Plug Number", and the data length of the information recorded subsequently is described in "Plug Status Length". Thereafter the data length of the succeeding status is described in "Status Length". And the plug status such as reproduction, record or stop is described in "Status".

"Position Length" denotes the data length of "Position" disposed next. In the case of the MD player 3 for example, "Position" indicates the playing/recording position of the MD 5 loaded in the player 3. More concretely, there is described a playing time (hour; minutes; seconds; frames) from the top of a predetermined track, or a playing time from a predetermined reference position in the innermost portion of the MD 5. "Mode Length" denotes the data length of "Mode" disposed next. "Mode" denotes setting of the plug. When the plug is in a playing state for example, there are described play-mode, repeat on/off, single on/off and so forth in "Mode". "Audio Level Length" indicates the length of the data described in "Audio Level". In "Audio Level" shown in FIG. 10B, there is described the audio level information of the audio data recorded or reproduced in the MD player 3. The audio level information described here is similar to the aforementioned one shown in FIG. 6B.

Figures 11, 12, 13:
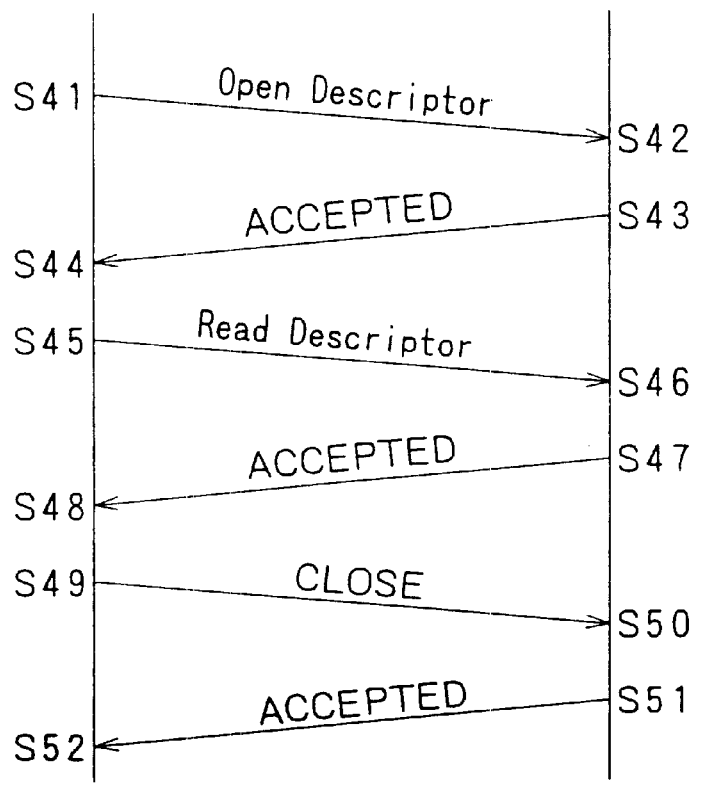
FIG. 11 is a timing chart of commands transmitted between the personal computer 1 as a controller and the MD player 3 as a target connected mutually via the IEEE1394 bus in the present invention, when reading out the audio level preset in the MD player 3 as a target from the personal computer as a controller.
FIG. 12 shows an example of audio levels described in the plug status descriptor.
FIG. 13 shows a data structure of a command read descriptor transferred from the personal computer 1 as a controller to the MD player 3 as a target when reading in th plug status descriptor preset in the MD player 3 as a target in the present invention.

The operation performed in this case is shown in a timing chart of FIG. 11. First at step S41, the CPU 11 of the personal computer 1 sends a command (Open Descriptor) to the MD player 3 via the 1394 communicator 19 for requesting an access to the Plug Status Descriptor of the MD player 3. Then at step S42, the CPU 31 of the MD player 3 receives the command from the personal computer 1 via the 1394 communicator 36, and sends a corresponding response (ACCEPTED) to the personal computer 1. At this time, as shown in FIG. 12 for example, the CPU 31 of the MD player 3 describes the audio level information of the reproduced audio data in addresses 40h to 43h of the Plug Status Descriptor while the drive 35 drives the MD 5.

The CPU 11 of the personal computer 1 receives the response from the MD player 3 at step S44, and then sends a command (Read Descriptor) to the MD player 3 at step S45 for reading the contents described in the Plug Status Descriptor. FIG. 13 shows an example of the description in the command. At step S46, the CPU 31 of the MD player 3 receives the command from the personal computer 1. Then at step S47, the CPU 31 sends to the personal computer 1 a response (ACCEPTED) where the audio level described in the Plug Status Descriptor is described as shown in FIG. 14 for example.

Subsequently at step S48, the CPU 11 of the personal computer 1 receives the response sent from the MD player 3, whereby the audio level information is acquired. Thereafter at step S49, the CPU 11 sends a command (CLOSE) to the MD player 3 for closing the Plug Status Descriptor. Next at step S51, the CPU 31 of the MD player 3 receives the command from the computer 1, and then sends a corresponding response (ACCEPTED) to the personal computer 1. And finally at step S52, the CPU 11 of the personal computer 1 receives the response sent from the MD player 3.

Figures 14, 15:
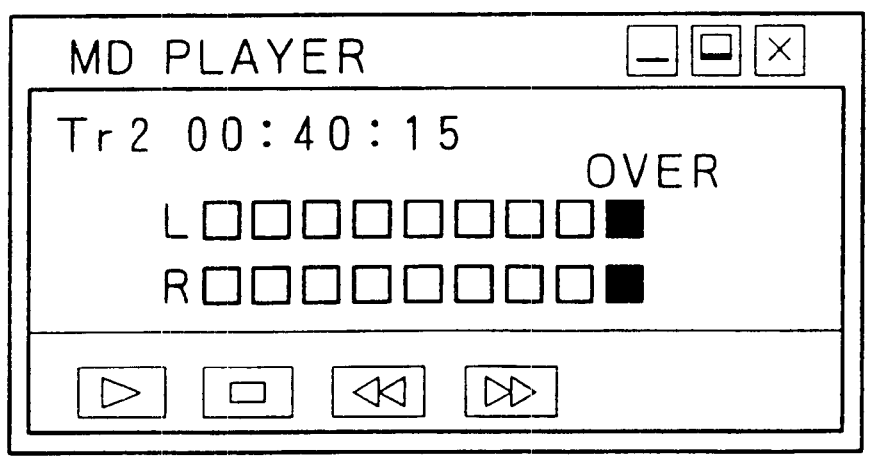
FIG. 14 shows an example of a response transferred when replying the audio level of the plug status descriptor from the MD player 3 as a target in the present invention.
FIG. 15 illustrates an example of display of the audio level read out from the MD player 3 as a target.

In the manner mentioned above, the audio level information is read from the MD player 3 by the use of Audio Level Read Command, so that it becomes possible to produce an application such as an audio level meter where, as illustrated in FIG. 15 for example, the display thereon is changeable in conformity with the audio level information thus acquired.

In this case, even if the MD player 3 and the personal computer 1 for example are positioned separately with a space from each other, the audio level display illustrated in FIG. 15 can be achieved on the side of the computer 1 when a command for reading out the audio level is sent from the computer 1 to the MD player 3 via the IEEE1394 bus.

In the embodiment of the present invention, the personal computer 1 is employed to serve as a controller. However, the internal functions of the personal computer 1 may be installed in an A/V (Audio/Visual) amplifier for example to execute the same control.

Further, a computer program for executing the above various processes may be provided to the user via a recording medium such as a magnetic disk, CD-ROM or MD, or via a provision medium such as a network. And when necessary, the program may be recorded in an internal RAM or hard disk.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A transmitting system wherein unitary data having an isochronous period for transmission of main data and an asynchronous period for transfer of command data is transmitted between a control apparatus and a target apparatus via a predetermined bus, wherein said control apparatus comprises control apparatus sending means for sending a target apparatus identifier to identify said target apparatus using said asynchronous period and for sending a signal-level transfer request command to request transfer of a signal level from said target apparatus, and said target apparatus comprises target apparatus receiving means for receiving said target apparatus identifier transmitted using said asynchronous period from said control apparatus sending means via said predetermined bus, and for receiving said signal-level transfer request command, and target apparatus sending means for sending said signal level in response to said signal-level transfer request command received by said target apparatus receiving means.

2. The transmitting system according to claim 1, wherein said predetermined bus is a bus conforming to an IEEE1394 standard.

3. The transmitting system according to claim 1, wherein said main data transmitted in said isochronous period is audio data, and wherein said signal level is an audio level.

4. A transmitting method wherein unitary data having an isochronous period for transmission of main data and an asynchronous period for transfer of command data is transmitted between a control apparatus and a target apparatus via a predetermined bus, said method comprising steps of:

sending, from said control apparatus to said target apparatus, a target apparatus identifier to identify said target apparatus using said asynchronous period and a command to request transfer of a signal level from said target apparatus;

receiving said target apparatus identifier transmitted using said asynchronous period via said predetermined bus, and also receiving said command to request transfer of said signal level from said target apparatus; and sending said signal level from said target apparatus to said control apparatus in response to said command to request transfer of said signal level from said target apparatus.

5. The transmitting method according to claim 4, wherein said predetermined bus is a bus conforming to an IEEE1394 standard.

6. The transmitting method according to claim 4, wherein said main data transferred in said isochronous said is audio data, and wherein said signal level is an audio level.

7. A transmitting/receiving system for receiving unitary data having an isochronous period and an asynchronous period, said unitary data being transmitted from a control apparatus via a predetermined bus, said transmitting/receiving system comprising:

receiving means for receiving a target apparatus identifier transmitted from said control apparatus via said predetermined bus using said asynchronous period, and for receiving a signal-level transfer request command to request transfer of a signal level from said target apparatus; and sending means for sending said signal level in response to said signal-level transfer request command received by said receiving means.

8. The transmitting/receiving system according to claim 7, wherein said predetermined bus is a bus conforming to an IEEE1394 standard.

9. The transmitting/receiving system according to claim 7, wherein said main data transferred in isochronous period is audio data, and wherein said signal level is an audio level.

* * * * *